United States Patent [19]

Hickinbotham

[11] Patent Number: 4,708,938
[45] Date of Patent: Nov. 24, 1987

[54] ALCOHOLIC FERMENTATION

[75] Inventor: Stephen J. Hickinbotham, Burwood, Australia

[73] Assignee: Hickinbotham Winemakers Pty. Ltd., Burwood, Australia

[21] Appl. No.: 726,158

[22] Filed: Apr. 23, 1985

[30] Foreign Application Priority Data

Apr. 30, 1984 [AU] Australia .............................. PG4757
Jan. 10, 1985 [AU] Australia .............................. PG8843

[51] Int. Cl.$^4$ .............................................. C12M 1/12
[52] U.S. Cl. ..................................... 435/311; 435/316; 222/95; 426/11; 426/15
[58] Field of Search .......................... 426/8, 11, 15, 16; 222/95, 386.5; 435/311, 316, 317

[56] References Cited

U.S. PATENT DOCUMENTS

| 1,280,280 | 10/1918 | Nathan | 426/16 |
| 2,564,163 | 8/1951 | Leperre | 222/95 X |
| 3,946,780 | 3/1976 | Sellers | 426/15 X |
| 4,027,427 | 6/1977 | Stoller et al. | 426/8 X |
| 4,098,434 | 7/1978 | Uhlig | 222/95 X |

Primary Examiner—Robert Yoncoskie
Attorney, Agent, or Firm—Larson and Taylor

[57] ABSTRACT

Fermentation method and apparatus comprising an outer container with a plastics bag hung from the neck of the container to define a chamber between the bag and the container. Means to pressurize the chamber with a temperature controlled medium to control fermentation of material within the bag. Additional pressurization of the chamber causing the fermented liquid to be expelled from the mouth of the bag.

7 Claims, 2 Drawing Figures

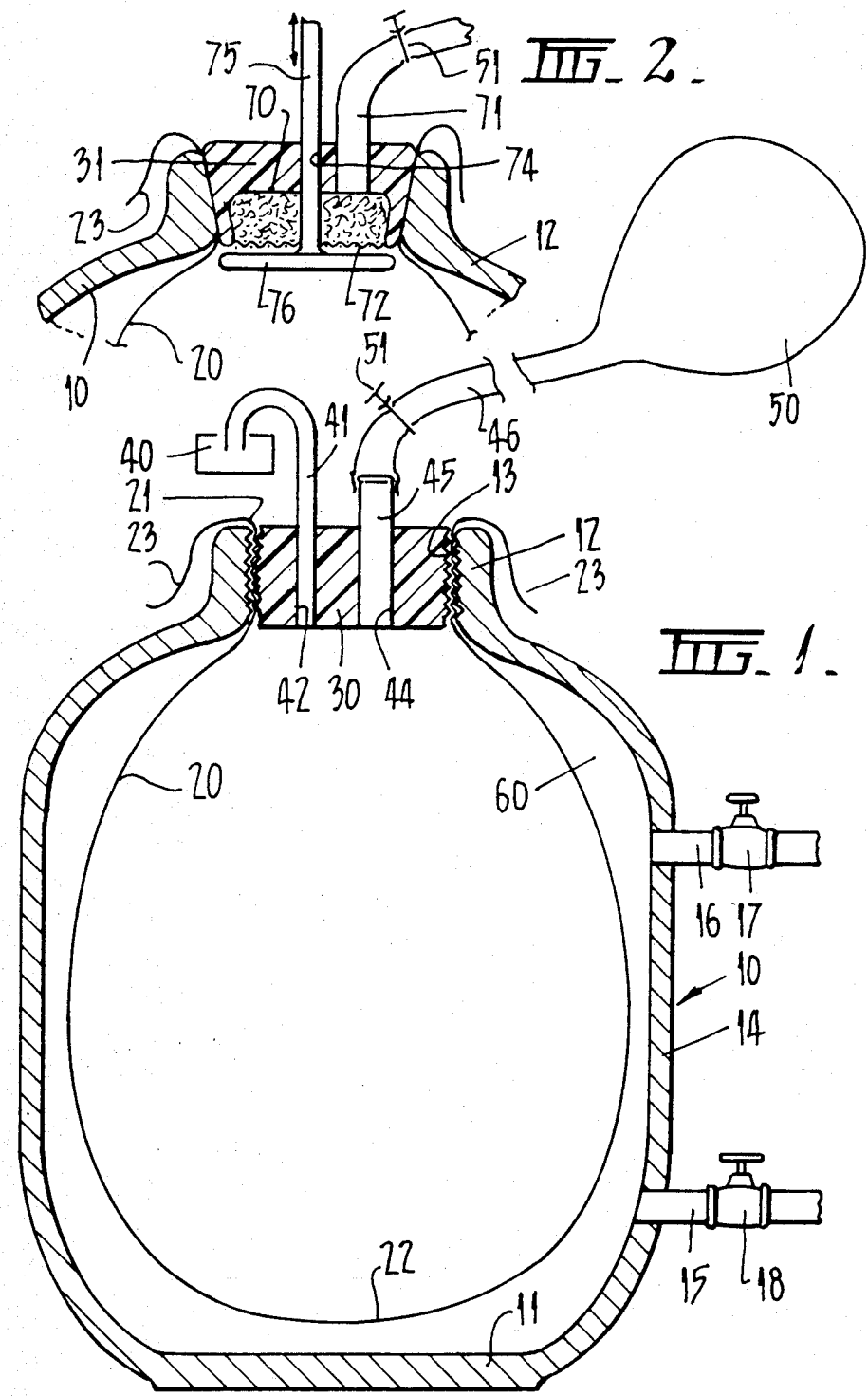

ALCOHOLIC FERMENTATION

FIELD OF THE INVENTION

The present invention relates to alcoholic fermentation. In particular the present invention relates to a process and apparatus for the alcoholic fermentation of wine, beer, cider or other alcoholic drink including low alcoholic soft drinks under controlled temperature and/or pressure conditions on a small scale.

SUMMARY OF PRIOR ART

The process of alcoholic fermentation is a process of enzymatic transformation of a carbohydrate material particularly grape material which yields alcohol and carbon dioxide. The alcoholic fermentation is desirably undertaken without the participation of oxygen. In prior art processes fermentation of grapes is usually undertaken in large scale wooden or stainless steel tanks. Such tanks would generally be of the size of approximately 1000 gallons or more. There is therefore a difficulty in undertaking fermentation of grapes where the supply of grapes is either low, e.g. in the preparation of specialist or experimental wine varieties; or where the supply of grapes varies depending on source and quantity required. Moreover, the cost of manufacturing small-size one-off tanks in e.g. stainless steel is prohibitively expensive. The prior art processes are inflexible in this area as a need for anaerobic conditions requires that the 1000 gallon tanks be full.

The prior art processes also have the disadvantage that fermentation of grapes is optimally undertaken under controlled temperature conditions. For example, in numerous applications temperatures of approximately 28° C. have been found to be optimal and variations of one or two degrees either way may result in loss of quality of the wine subsequently produced. It will be understood that when dealing with large scale stainless steel and wood tanks the cost and efficiency of temperature control present substantial difficulties.

A further problem with prior art processes, especially in small scale domestic production, is the problem of separating the wine from the sediment. Siphoning techniques are most commonly used with varying degrees of success.

SUMMARY OF THE INVENTION

It is an object of this invention to provide a process and apparatus that makes alcoholic fermentation on a small scale easier, more reliable and inexpensive.

According to a first aspect of the present invention there is provided fermentation apparatus comprising an outer container with a sealable liner secured within the container to define a pressurizable chamber between the exterior of the liner and the interior of the container, the container having fluid inlet and outlet means in communication with said chamber.

According to a further aspect of the present invention there is provided fermentation apparatus comprising a rigid container having an open top and fluid inlet and outlet means, an air impervious plastics bag located within the container by a stopper arranged to secure said plastics bag to hang from the open top and to seal the top and to define a chamber between the exterior of the bag and the interior of the container, the stopper having a delivery outlet whereby, in use, a fermentation mixture can be placed within the bag and the bag sealed by the stopper, and a temperature controlling medium such as water can be circulated into the chamber via the inlet and outlet means to cause the bag to assume the volume of its contents and to control the temperature at which fermentation takes place, and when fermentation is complete, the chamber can be pressurized to force the liquid within the bag to be expelled via the delivery outlet.

Another aspect of the present invention concerns a process of alcoholic fermentation comprising placing material to be fermented into a plastics liner within a container, filling the space between the liner and the container with a temperature controlling liquid and, completing the fermentation under controlled temperature by controlling the temperature of the liquid between the liner and the container.

The process may also comprise placing the product to be fermented in a flexible plastics liner within a container, sealing the liner to prevent entry of air but allowing escape of gases, completing the fermentation, and further pressurizing the space between the liner and the container to cause the contents of the liner to be expelled from the top of the liner.

A still further aspect of the invention embraces a method of producing draught beer comprising placing wort and yeast into a plastics bag within a container, sealing the plastics bag with a pressure release valve, completing the fermentation, and drawing off the draught beer by pressurizing the space between the bag and the container to cause the beer to be expelled under pressure via the release valve.

The process and apparatus described above is especially designed to allow alcoholic fermentation on a small scale. The size and volume of the components of the apparatus will vary depending on the scale envisaged.

DESCRIPTION OF THE DRAWINGS

The present invention will now be described by way of example only with reference to the accompanying drawings in which:

FIG. 1 is a cross-sectional view of fermentation apparatus; and

FIG. 2 is a partial cross-sectional view of a type of stopper for use in the apparatus of FIG. 1.

DESCRIPTION OF THE PREFERRED EMBODIMENTS

Fermentation apparatus for use on a small or domestic scale comprises as shown in FIG. 1 a rigid outer container 10. The container may be manufactured of any suitable material such as wood, plastics or metal. The walls of the container are impermeable and are preferably insulated. The container 10 has a free standing base portion 11 and terminates at the other end in a neck portion 12 defining an aperture 13. The wall 14 of the container is provided with a fluid inlet pipe 15 adjacent the base of the container and a fluid outlet pipe 16 adjacent the top. Both pipes incorporate control valves 17 and 18 in the form of taps. The fluid inlet and outlet pipes are connected to a source of mains water pressure.

The fermentation apparatus also comprises a bag 20 made of suitable plastics that, in an ideal situation, is oxygen and carbon dioxide impermeable. The plastics bag 20 has an opening 21 at one end and is closed at the other end 22. The bag is draped within the container 10 with overlapping edges 23 extending over the neck 12 of the container. A suitable stopper 30 which may be made of any suitable material such as cork, rubber, plastics or wood is then inserted into the aperture 13 to seal the aperture of the container and also to firmly hold the bag against the wall of the aperture so the bag is hung from the neck of the container as shown in FIG. 1. It is understood that the stopper may be in screw threaded engagement with the inside surface of the neck of the container or alternatively the neck 12 may be tapered as shown in FIG. 2 to accommodate a suitably tapered stopper. The stopper has a one way valve 40 in the form of an air lock that is in fluid communication with the interior of the bag 20 via a pipe 41 that extends through a hole 42 in the stopper 30. The stopper 30 is also provided with a delivery hole 44 and has inserted therein a delivery pipe 45. The delivery pipe 45 is arranged to be connected to a flexible coupling 46 that is in turn connected to a collapsed second plastics bag 50. Suitable valving 51 is provided to control release of fluid from the pipe 45.

The bag 20 is designed to be of such a size that when substantially full it assumes the profile as shown in FIG. 1. That is substantially filling the enclosure within the container 10 but leaving a space 60 between the bag and the interior wall of the container 10. This space 60 is sealed from the exterior by the stopper 30 and can be filled with water from the fluid inlet 15.

To use the fermentation apparatus illustrated in FIG. 1 to make wine or beer or other low alcoholic drinks including soft drinks, the must in the case of wine or wort in the case of beer is placed in the plastics bag 20 together with any other additives and, if necessary, selected yeast. The bag is filled to the desired level and then hung from the neck of the container by inserted the stopper 30 firmly into position into the neck of the container. The delivery pipe 45 is closed by means of the valve 51 which means that no air can enter the bag 20. The fermentation or brewing process produces carbon-dioxide which escapes from the bag via the air lock 40.

Since the majority of fermentation or brewing processes are very temperature dependent, water at a specifically controlled temperature is continuously passed into the container 10 via the inlet 15 and the outlet 16. In this manner the space 60 surrounding the bag is, throughout the fermentation process, filled with water at a desired temperature so that the temperature of the fermentation process can be carefully controlled. It is understood that suitable temperature control means may be incorporated within the water line to ensure recirculation of water at the desired temperature. Furthermore the water pressure causes the bag to collapse around its contents thereby ensuring there is no unwanted air within the bag.

In a normal brewing or fermentation process the primary fermentation ceases when no more carbon-dioxide is produced and sediment collects at the bottom of the bag with clear liquid thereabove. Once the fermentation is complete the fluid outlet valve 17 is closed and the delivery valve 51 is opened to be in fluid connection with the evacuated plastics bag 50. Mains water under pressure is then allowed to enter the space 60 via the fluid inlet 15 and the pressure of the water has the effect of causing inward motion of the wall of the bag thereby forcing the contents of the bag out through the delivery outlet 45 to be collected in the evacuated bag 50. In this manner all the liquid above the sediment is transferred to the evacuated bag anaerobically. Control of the mains water pressure can ensure that all the liquid above the sediment is expelled from the bag without displacing the sediment. Because the sediment is of higher density than the liquid above it, pressurisation of the space outside the bag causes the bag above the sediment to collapse thereby forcing out the liquid. Eventually the bag tends to collapse around the sediment thereby reducing the opportunity for the sediment to cloud the liquid. In this way the apparatus can be used to ensure carefully controlled fermentation whilst at the same time providing a simple and effective means of collecting the fermented liquid without the use of means such as siphons. The bag is disposable and a fresh bag can be used for each fermentation process thereby reducing the occurrence of harmful micro-organisms emanating from dirty equipment.

When the fermentation apparatus is used to manufacture red wine the must contains crushed skins and stems of the berries together with the grape juice. When the fermentation process commences the carbon-dioxide produced tends to collect on the grape skins and stems causing them to float at the top of the liquid. It is common practice to periodically cause the floating debris to be immersed in the liquid to leach out the colour and flavouring from the skins and stems.

The fermentation apparatus illustrated in FIG. 2 is specifically designed for use with red wine production. In this embodiment the stopper 31 is provided with a central recess 70 on its under surface. The recess 70 is in communication with the delivery outlet 71 and is covered by a circular sieve 72. The recess is arranged to house a suitable filtering material such as diatomaceous earth. The stopper is also provided with a central aperture 74 through which a shaft 75 extends. The shaft 75 is coupled to a plunger member 76 and is arranged to be depressed so that the plunger member can push floating matter into the liquid within the plastics bag. It is understood that the shaft is in sealed engagement with the stopper to prevent entry of air. Periodic use of the plunger ensures that the floating matter is immersed into the liquid as desired. When the fermentation process is complete the liquid is expelled in the same manner as described earlier except that in this case the sieve and diatomaceous earth act as a very efficient filtering system to preclude escape of unwanted debris. By careful control of the pressure of the water within the space 60 the rate of escape of the liquid within the bag can be controlled so that a very slow but effective filtering takes place. It is further understood that other filters may be positioned downstream in the pipe from the container to a collapsed plastics bag of the kind shown in FIG. 1. In this way red wine can be produced without the use of presses, de-stemers and sophisticated filters.

The pressurisation of the space between the plastics bag and the container ensures that the bag collapses around its contents to ensure that there is no unwanted air within the bag. Further pressurisation also causes efficient and controlled expulsion of the fermented liquid and not the sediment in the base of the bag. The water which is the pressure medium also supports the bag within the container and reduces the stress that would be placed on the bag should it hang freely from the neck of the container. The fact that the bag is supported to hang from the top of the container makes the contents much more accessible. Furthermore the use of external pressure to force the liquid out of the bag provides a simple yet effective means of sparging air or oxygen that might accidentally enter the bag.

By replacing the one way valve with a pressure control valve, fermentation can, if necessary, take place under pressure. The carbon dioxide produced by the fermentation process can be used to pressurise the whole apparatus without damaging the bag. This is carried out by ensuring that there is a pressure balance between the interior and exterior of the bag.

Pressured fermentation is used in certain white wine manufacturing processes and is particularly useful in the production of draught beer. The apparatus can be used to make small quantities of pressurised beer which can be chilled by either chilling the pressurising medium (water) or by placing the whole apparatus in a refrigerator. To draw off the beer the water pressure outside the bag is increased to cause the pressurised beer to be expelled via a suitable tap. There is no need to separate the liquid from the sediment and induce secondary fermentation in a bottle as in the case with most home beer brewing kits.

In our co-pending Australian Patent Application No. 20211/84 there is disclosed a method of making wine by the process of full carbonic maceration.

Carbonic maceration is defined as a process in which fermentation of the grapes occurs by intra-cellular fermentation only, that is the fermenation is generated by utilisation of the enzymes present within the grapes themselves. The term relates to fermentation techniques which do not involve crushing the grapes. Uncrushed bunches of grapes are placed in a closed container that is filled with carbon dioxide gas. Under these conditions, the entire berries undergo an intra-cellular or auto-fermentation. After a period of maceration and completion of fermentation the grapes are crushed and pressed. Fermentation by carbonic maceration is considered highly desirable by winemakers because the process produces natural aromatic qualities not usually produced by fermentation of crushed grapes. The fermentation process produced by the enzymes of the berries produces glycerine and certain other constituents, breaks down the malic acid and alters the physical appearance of the berries. Consequently this process softens the wine and produces a more complex flavour.

The expression "full carbonic maceration" is defined as a carbonic maceration process carried out in such a way that more than 85% of the grapes remain whole and uncrushed up to the time that the carbonic maceration is completed.

The essence of the process disclosed in co-pending application 21211/84 is that the uncrushed grapes complete intra-cellular fermentation in an anaerobic atmosphere. The anearobic atmosphere is created by forcing the air out of the container that holds the grapes by filling the air space above the grapes with carbon dioxide ($CO_2$). This can be carried out by either forcing $CO_2$ into the container or by placing a quantity of dry ice into the container, the vapourisation of the dry ice forcing the air out of the container. After the intra-cellular fermenation is complete the grapes are crushed, destemed, subjected to final fermentation and filtering treatments and bottled. The process has the major advantage that excellent drinking red and white wine can be produced within a period of two weeks from wine to bottle.

The apparatus described above, with particular reference to FIG. 2 is considered very suitable for the production of wine by carbonic maceration. Whole grapes may be positioned within the bag 20 to a depth that little or no crushing of the grapes takes place. The bag can be sealed and the space above the grapes evacuated by filing the chamber 60 between the bag 20 and container 10 with water to cause the bag to collapse around the grapes.

A small amount of $CO_2$ may be added in the form of dry ice to force out any air that might remain in the bag.

During the process of intra-cellular fermentation the $CO_2$ produced escapes via the airlock 41. When the fermentation is complete the chamber 60 may be further pressurised by increasing the water pressure within the chamber 60 to cause the bag to dry and force the grapes out through the delivery outlet via the filter. The contact pressure of the grapes against the filter crushes the grapes and allows the juice to be forced out of the bag through the delivery outlet via the filter which prevents the escape of the skins and stems. By this means wine can be produced by the process of carbonic maceration with simple equipment without the need for destemers and crushers.

The fermentation apparatus described above can be of any suitable size, shape or form and is not restricted to the embodiments described. However it is specifically designed for use on a small scale. The throw away plastics bags ensure a very clean and hygienic environment for the fermentation process. The use of an evacuated second plastics bag to collect the wine, beer or other alcoholic drink produced again ensures that the contents are not exposed to air which can cause harmful deterioration.

It is envisaged that the fermentation apparatus described above may be sold in kits for use both in the commercial production of specialized wines as well as the do-it-yourself wine or beer production.

Although the preferred embodiment discloses the use of mains water as the pressure medium it is understood that the fluid inlet and outlet may be connected to a variable pressure pump and temperature control means to provide a system with a closed pressurization circuit.

Having now described my invention, what I claim is:

1. Fermentation apparatus comprising a rigid container having an open top, a liquid transfer inlet positioned adjacent the base of the container and a liquid transfer outlet positioned adjacent the top of the container, valve means to control flow of liquid in and out of the inlet and outlet, an air impervious plastic bag located within the container to hang from the open top, and configured to define a chamber between the exterior of the bag and the interior of the container, and means for sealing the top, said sealing means including a delivery outlet and filter means positioned across the top of the container wherein in preparing an alcoholic beverage a fermentation mixture is placed within the bag and the bag sealed, and by use of the valve means a temperature controlling medium is circulated into the chamber via the inlet and outlet to cause the bag to assume the volume of its contents and to control the temperature at which fermentation takes place, and when fermentation is complete, the chamber is pressurized to force the liquid within the bag to be expelled through the filter means and via the delivery outlet.

2. Fermentation apparatus according to claim 1 wherein the liquid transfer inlet and outlet are each provided with control valves and wherein the inlet is coupled to a mains water supply so that the chamber is pressurized by the mains water.

3. Fermentation apparatus according to claim 1 wherein the liquid inlet and outlet are coupled to a pump to form a closed circuit with the chamber.

4. Fermentation apparatus according to claim 1 wherein the open top of the container comprises a neck defining an aperture and the bag is hung in a sealed manner from the neck by being clamped against the neck of the container by a stopper.

5. Fermentation apparatus according to claim 4 wherein the stopper incorporates a displaceable plunger that is operated from the exterior of the container, the plunger extending into the interior of the bag for periodically depress floating matter under the liquid in the bag.

6. Fermenation apparatus according to claim 4 wherein the stopper incorporates the filter means.

7. Fermentation apparatus according to claim 1 comprising means to control the temperature of the liquid within the chamber.

* * * * *